Dec. 1, 1959  F. H. EVANS  2,915,199
SLAB TURNING APPARATUS
Filed May 6, 1957  3 Sheets-Sheet 1

INVENTOR.
*Frederick H. Evans*
BY
*Frease & Bishop*
ATTORNEYS

Dec. 1, 1959  F. H. EVANS  2,915,199
SLAB TURNING APPARATUS
Filed May 6, 1957  3 Sheets-Sheet 2

INVENTOR.
*Frederick H. Evans*
BY
*Frease & Bishop*
ATTORNEYS

Dec. 1, 1959 F. H. EVANS 2,915,199
SLAB TURNING APPARATUS
Filed May 6, 1957 3 Sheets-Sheet 3

INVENTOR.
Frederick H. Evans
BY
Frease & Bishop
ATTORNEYS

United States Patent Office 2,915,199
Patented Dec. 1, 1959

2,915,199

SLAB TURNING APPARATUS

Frederick H. Evans, Massillon, Ohio, assignor to Evans Enterprises, Inc., Massillon, Ohio, a corporation of Ohio Application May 6, 1957, Serial No. 657,340

8 Claims. (Cl. 214—1)

The invention relates to apparatus for handling slabs and the like, and more particularly to apparatus for turning a slab or similar article so as to successively present the opposite faces thereof for the purpose of inspection, chipping, grinding or the like.

In steel mill practice, slabs and the like, after being rolled, are inspected and marked for any chipping or grinding which may be found necessary to remove imperfections from the surfaces thereof. This requires that each slab be turned over so as to successively present opposite faces thereof for such inspection, chipping, grinding or the like.

Under present practice no adequate apparatus is available for turning of such slabs and the like. This turning of slabs and the like is usually performed manually, this being a time and labor-consuming operation which adds to the cost of production.

It is therefore an object of the invention to provide a machine upon which slabs and the like may be quickly and easily turned over so as to successively present opposite faces thereof for inspection and chipping or the like.

Another object is to provide such an apparatus upon which a slab may be placed with one side upward for inspection and cleaning, and which includes means for turning the slab over to present the opposite side thereof for inspection, etc.

A further object is to provide an apparatus of the character referred to having lift arms and turning arms which cooperate to turn a slab so as to successively present opposite faces thereof to the workman.

A still further object is to provide an apparatus of this type in which the lift arms are normally horizontally disposed whereby a slab may be placed flat thereon with one face uppermost.

Another object of the invention is to provide such an apparatus in which the lift arms are caused to oscillate about a pivot to turn the slab on edge and move it into contact with the turning arms.

A further object is to provide apparatus of the character referred to have pivotally mounted, segmental turning arms which cooperate with the lift arms to turn a slab over.

A still further object is to provide such a slab-turning apparatus in which the lift arms and turning arms are operated by fluid cylinders.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms the invention may be briefly described as comprising a frame of sufficient length to accommodate the slabs to be handled, and having an elevated platform thereon to permit workmen to have access to the slabs.

A series of lift arms are pivotally mounted at one side of the frame, and normally extend laterally therefrom, in horizontal position, to support a slab flatwise thereon, with one side upward.

Segmental turning arms are pivotally mounted in the frame and adapted to be projected upward through slots in the platform, to cooperate with the lift arms in turning a slab over so as to present the other side thereof upward.

Fluid cylinder means are provided for raising and lowering the lift arms and turning arms in proper sequence to accomplish the turning of a slab with each operation of the apparatus.

Having thus briefly described the invention, reference is now made to a preferred embodiment thereof illustrated in the accompanying drawings, in which.

Figure 1:
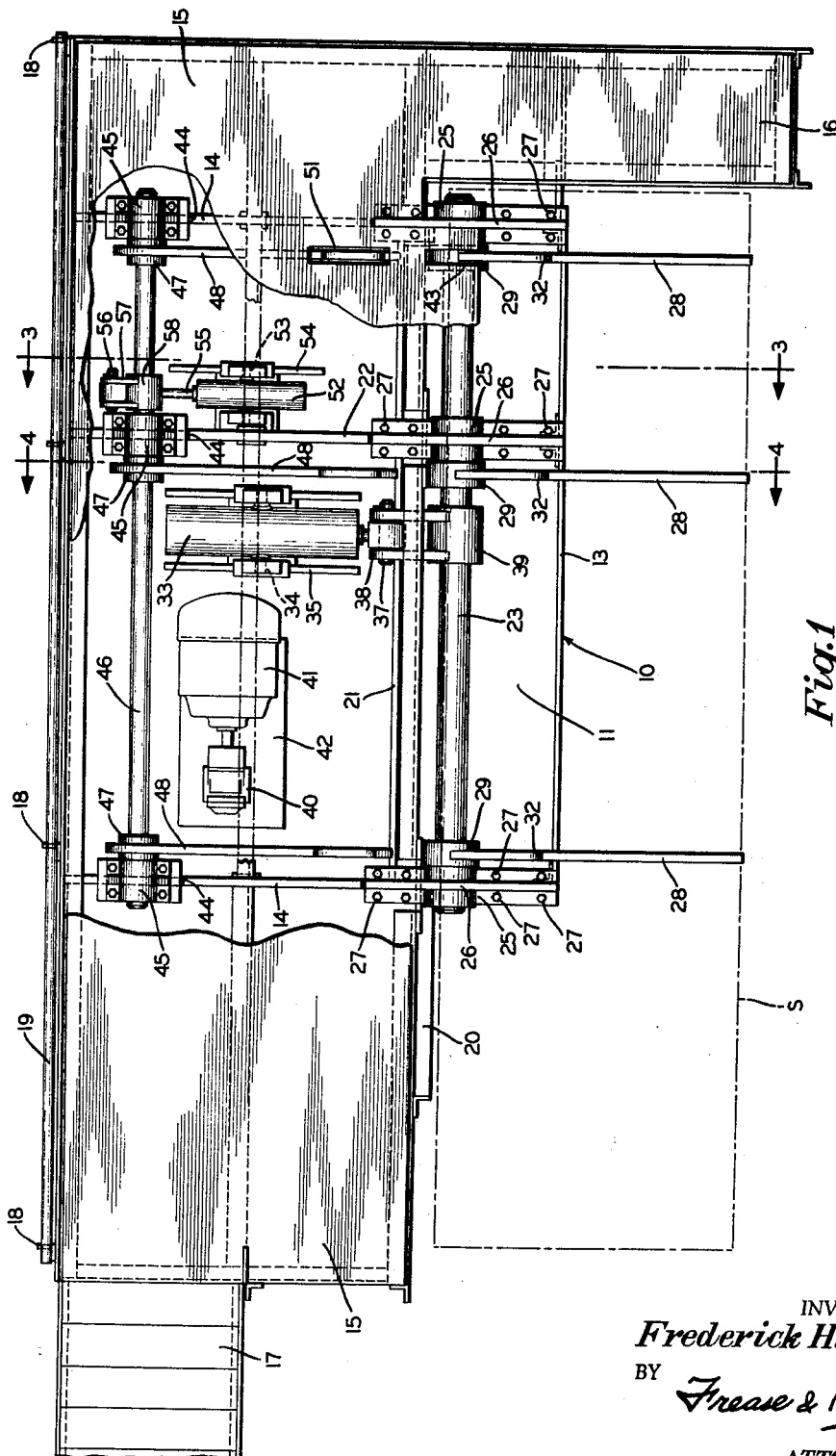
Fig. 1 is a top plan view of the improved slab-turning apparatus, with parts broken away for the purpose of illustration, showing the parts in the normal position with a slab, shown in broken lines, lying flatwise upon the lift arms.
Figure 2:
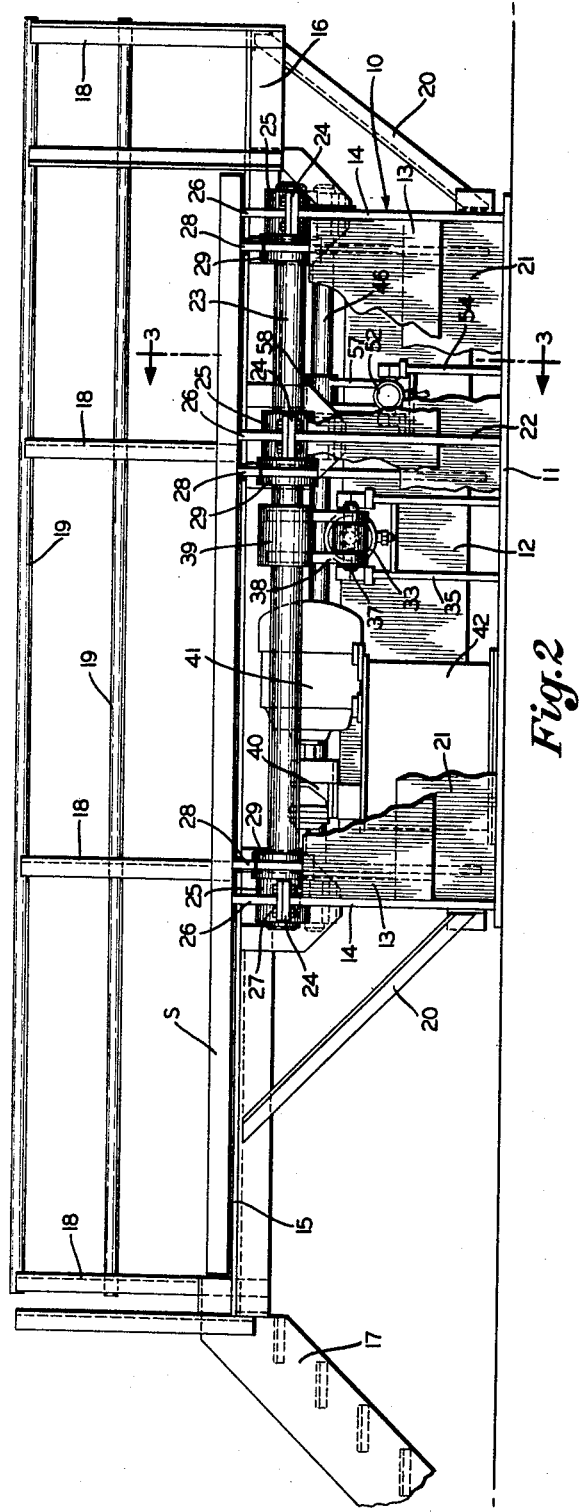
Fig. 2 is a front elevation, with parts broken away, showing the apparatus in the position shown in Fig. 1.
Figure 3:
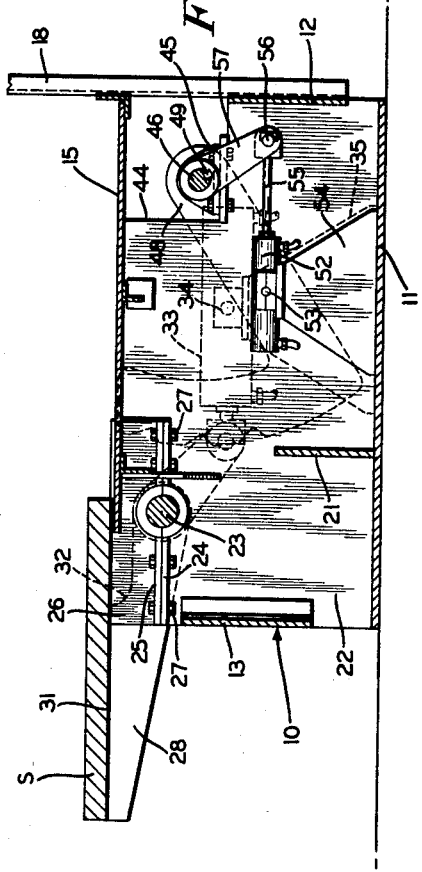
Figure 5:
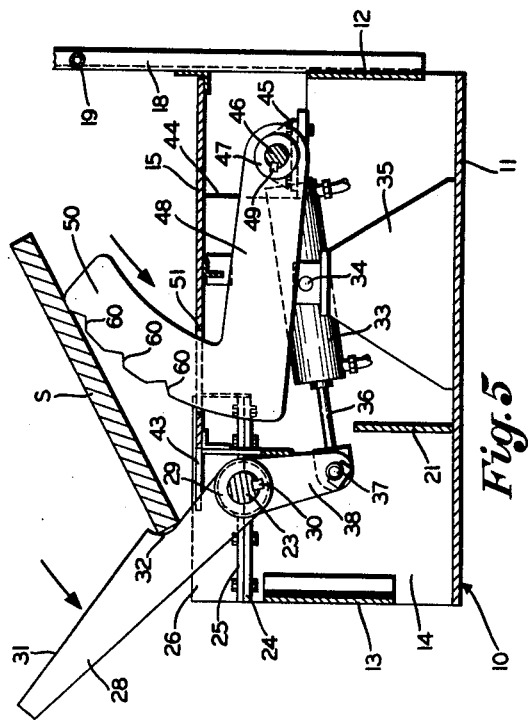
Figure 6:
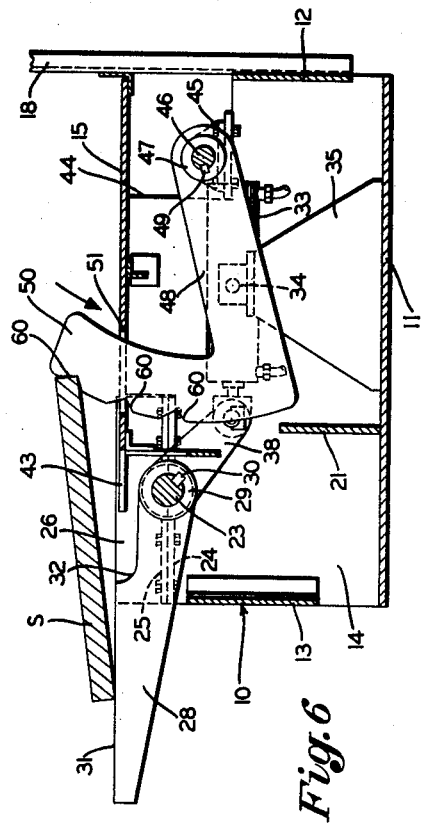
Figure 4:
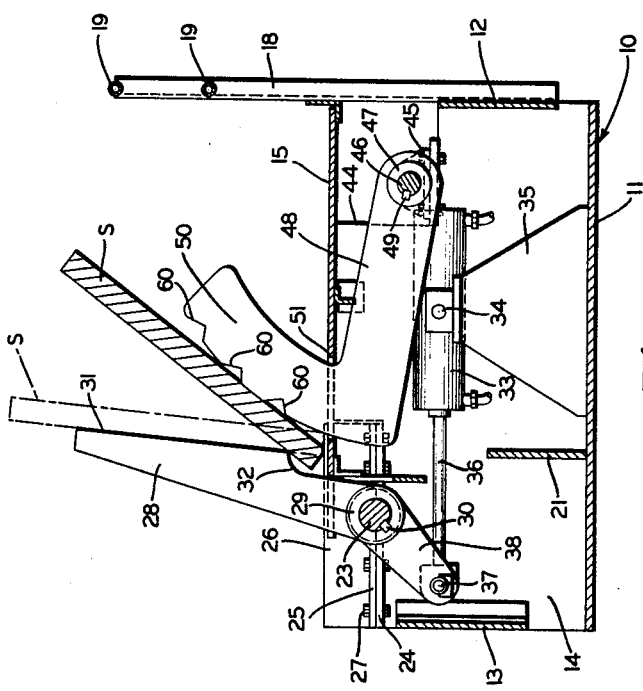

Fig. 3 is a transverse section, taken on the line 3—3, Figs. 1 and 2, showing the parts in the normal position as shown in Figs. 1 and 2;

Fig. 4 is a transverse section, taken as on the line 4—4, Fig. 1, showing the lift arms and turning arms in raised position with the slab in substantially edgewise position and resting against the turning arms;

Fig. 5 is a view similar to Fig. 4, showing the lift arms and turning arms as they start their downward movements, with the slab partially turned over; and Fig. 6 is a similar view, showing the lift arms returned to lowered position and the turning arms near the end of their lowering movement, with the slab turned over and being deposited upon the horizontally positioned lift arms.

Referring now more particularly to the embodiment of the invention illustrated, the apparatus includes a housing indicated generally at 10, within which the operating mechanism is located. This housing comprises the base plate 11, back wall 12 and front wall 13, both of which may terminate at points spaced from the top and bottom of the housing, and the end walls 14.

A platform, which may comprise a grating 15 is mounted upon the top of the housing 10 to provide a place from which workmen may inspect a work upon slabs positioned in the apparatus. This platform may include an angular extension 16 at one end of the apparatus. The other end of the paltform may extend some distance beyond the adjacent end of the housing, and steps 17 provide access to this end of the platform.

As a safety measure to prevent workmen from accidently falling from the platform, uprights 18 may extend upwardly from the outer or rear edge of the platform to support the horizontal rails 19. The overhanging ends of the platform may be supported by the angular struts 20 connected at their lower ends to the end walls 14 of the housing 10.

A partition wall 21, terminating at a point spaced from the top of the housing, is located longitudinally through the housing being connected to the base 11 and the ends 14 thereof.

A partition wall 22 is transversely disposed within the housing and connected at opposite ends to the back and front walls 12 and 13 respectively thereof. The upper forward corners of the end walls 14 and transverse partition wall 22 are cut out to receive bearings for the rocker shaft 23, upon which the lift arms are mounted, as will be later described.

Each of these bearings is a two-part bearing comprising the lower member 24 and the upper member 25 upon which is provided the upwardly disposed flange 26 extending to a point slightly above the top of the platform 15. The bearing members 24 and 25 are bolted together as by bolts 27.

The lift arms, indicated generally at 28, are provided with hub portions 29 which are fixed upon the rocker shaft 23 as by keys 30. These lift arms normally extend forwardly from the rocker shaft 23 in the position shown in Figs. 1, 2 and 3.

In this position, as best shown in Fig. 3, the upwardly disposed edges 31 of the lift arms are horizontally disposed and located in the same horizontal plane as the upper edges of the flanges 26 on the upper bearing members 25. Adjacent to the rocker arm 23, these edges are cut away or recessed as indicated at 32 for a purpose to be later described.

The rocker arm 23 is adapted to be oscillated in order to raise and lower the lift arms 28. For this purpose, a double-acting fluid cylinder 33 is provided. This cylinder is pivotally mounted, intermediate its ends as indicated at 34, upon a bracket 35 located within the housing 10 and mounted upon the base 11 thereof.

The piston rod 36 of the cylinder 33 is disposed forwardly and is pivotally connected, as at 37, to the bifurcated rocker arm 38, the hub portion 39 of which is fixed upon the rocker shaft 23.

The cylinder 33 is connected by conventional fluid lines with a fluid pump 40 operated by a motor 41. Both the motor and pump are shown as mounted upon a bracket 42 located within the housing 10.

The forward edge of the platform 15 is notched, as shown at 43, to accommodate the lift arms as they are swung to raised position. The upper rear corners of the end walls 14 and the transverse partition wall 22 are cut away, as indicated at 44, so as to mount the bearings 45 for a rocker shaft 46.

The hub portions 47 of the turning arms 48 are fixed upon the rocker shaft 46 as by keys 49. Each turning arm 48 has a segmental portion 50 at its forward end. The platform 15 is provided with slots 51 to accommodate these segmental portions of the turning arms.

A fluid cylinder 52 is provided for oscillating the rocker shaft 46 in order to raise and lower the turning arms. This cylinder is shown as pivotally mounted, intermediate its ends as at 53, upon a bracket 54 located within the housing 10 and mounted upon the base 11 thereof.

The piston rod 55 of the cylinder 52 is pivotally connected, as at 56, to the bifurcated rocker arm 57, the hub 58 of which is fixed upon the rocker shaft 46. The cylinder 52 is a double-acting fluid cylinder, opposite ends of which are connected by conventional tubing with the fluid pump 40.

The parts are normally located in the position shown in Figs. 1, 2 and 3, with the turning arms retracted within the housing, and with the lift arms in the horizontal position as best shown in Fig. 3. A slab, as indicated at S, may be positioned flatwise upon the forwardly extended lift arms, as shown in Figs. 1 to 3.

In this position, the upper surface of the slab may be inspected and any necessary chipping or grinding thereon may be done by workmen on the platform 15. After this surface of the slab has been inspected and chipped or ground, the apparatus may be operated to turn the slab over so as to present the opposite surface to the workman.

In the operation of the machine, the motor 41 is started, operating the pump to deliver fluid to the cylinders 33 and 52 so as to oscillate the rocker shafts 23 and 46 clockwise, as viewed in Figs. 3 to 6.

Oscillation of the rocker shaft 46 in this direction will raise the segmental turning arms 50 to the position shown in Fig. 4, and simultaneously, the oscillation of the rocker shaft 23 in the same direction will raise the lift arms 28 to the raised position, as also shown in Fig. 4, tilting the slab S on edge, as shown in broken lines in said figure, and as it passes over center causing the slab to drop against the raised segmental turning arms 50, as shown in full lines in Fig. 4.

It will be seen that at this time the lower edge of the slab, resting upon the upper edges of the flanges 26, will be received within the recesses 32 of the lift arms.

Suitable control valve mechanism (not shown) is provided for reversing the flow of fluid from the pump to the cylinders 33 and 52, so as to start rotation of the rocker shafts 23 and 46 in counter-clockwise direction, as shown in Fig. 5.

The lift arms 28 will thus start movement in counterclockwise direction, as indicated by the arrow in Fig. 5, permitting the slab, the lower edge of which is still received within the recesses 32 of the lift arms, to start to slide downward and to the left, upon the turning arms, with the opposite side of the slab thus delivered upward. The turning arms 50 will at the same time start their downward movement.

As this downward movement is continued, the lift arms 28 will return to the horizontal position as shown in Fig. 6. The lower or left hand edge of the slab S by this time will have slid out of the recesses 32 of the lift arms and the upper or right hand edge of the slab will have dropped into one of the notches 60 in the turning arms.

As the turning arms continue the downward movement, they will push the slab toward the left, sliding it upon the horizontal lift arms, and as the turning arms return to the completely lowered position, the slab will be located upon the lift arms in the position shown in Fig. 3, with the opposite side of the slab presented upward to the workman.

The segmental portions 50 of the turning arms are provided with a plurality of notches 60 so as to accommodate slabs of different widths and also to permit the edge of a slab to engage in a lower notch in the event it does not engage in an upper notch.

From the above it will be obvious that a simple, efficient and easily operated apparatus is provided for quickly and easily handling slabs and the like and turning them over so as to successively present opposite faces thereof for inspection or cleaning.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Apparatus for turning slabs and the like having opposite flat faces, comprising a plurality of substantially straight lift arms pivoted on fixed pivots, a plurality of turning arms pivoted on fixed pivots laterally spaced from the pivots of the lift arms a distance slightly greater than the length of the turning arms, the lift arms having recesses in their upper surfaces, said recesses extending from the pivots to a point adjacent the pivots, a segmental portion on the free end of each turning arm and concentric with the pivot thereof, the lift arms being normally located in substantially horizontal position for receiving a slab flatwise thereon with one flat face thereof upward the turning arms being normally located in lowered position, means for raising the turning arms, means for simultaneously raising the lift arms to upright position to turn the slab on edge and deposit it against the segmental portions of the turning arms the lower edge of the slab being received in said recesses in the lift arms, means for lowering the lift arms to substantially horizontal position to cause the lower edge of the slab to slide out of said recesses and to slide upon the lift arms, and means for lowering the turning arms to cause the slab to return to flatwise position upon the lift arms with the opposite flat face thereof upward.

2. Apparatus for turning slabs and the like having opposite flat faces, comprising a plurality of substantially straight lift arms pivoted on fixed pivots, the lift arms having recesses in their upper surfaces, said recesses extending from the pivots to a point adjacent thereto, a plurality of turning arms pivoted on fixed pivots, a segmental portion on the free end of each turning arm and concentric with a pivot thereof, the lift arms being normally located in substantially horizontal position for receiving a slab flatwise thereon with one flat face thereof upward, the turning arms being normally located in lowered position, means for raising the turning arms, means for simultaneously raising the lift arms to upright position to turn the slab on edge and deposit it against the segmental portions of the turning arms, the lower edge of the slab being received in said recesses in the lift arms, means for lowering the lift arms to substantially horizontal position to cause the lower edge of the slab to slide out of said recesses and to slide upon the lift arms, and means for lowering the turning arms to cause the slab to return to flatwise position upon the lift arms with the opposite flat face thereof upward.

3. Apparatus for turning slabs and the like having opposite flat faces, comprising a plurality of substantially straight lift arms pivoted on fixed pivots, a plurality of turning arms pivoted on fixed pivots, laterally spaced from the pivots of the lift arms a distance slightly greater than the length of the turning arms, the lift arms having recesses in their upper surfaces, said recesses extending from the pivots to a point adjacent thereto, a segmental portion on the free end of each turning arm and concentric with the pivot thereof, there being notches in the peripheries of said segmental portions, the lift arms being normally located in substantially horizontal position for receiving a slab flatwise thereon with one flat face thereof upward, the turning arms being normally located in lowered position, means for raising the turning arms, means for simultaneously raising the lift arms to upright position to turn the slab on edge and deposit it against the segmental portions of the turning arms, the lower edge of the slab being received in said recesses in the lift arms, means for lowering the lift arms to substantially horizontal position to cause the lower edge of the slab to slide out of said recesses and to slide upon the lift arms to position the upper edge of the slab in said peripheral notches in the segmental portions of the turning arms, and means for lowering the turning arms to cause the slab to return to flatwise position upon the lift arms with the opposite flat face thereof upward.

4. Apparatus for turning slabs and the like having opposite flat faces, comprising a plurality of substantially straight lift arms pivoted on fixed pivots, the lift arms having recesses in their upper surfaces adjacent to the pivots, a plurality of turning arms pivoted on fixed pivots, laterally spaced from the pivots of the lift arms a distance slightly greater than the length of the turning arms, a segmental portion on the free end of each turning arm and concentric with the pivot thereof, there being notches in the peripheries of said segmental portions, the lift arms being normally located in substantially horizontal position for receiving a slab flatwise thereon with one flat face thereof upward, the turning arms being normally located in lowered position, means for raising the turning arms, means for simultaneously raising the lift arms to upright position to turn the slab on edge and deposit it against the segmental portions of the turning arms, the lower edge of the slab being received in said recesses in the lift arms, means for lowering the lift arms to substantially horizontal position to cause the lower edge of the slab to slide out of said recesses and to slide upon the left arms to position the upper edge of the slab in said peripheral notches in the segmental portions of the lift arms, and means for lowering the turning arms to cause the slab to return to flatwise position upon the lift arms with the opposite flat face thereof upward.

5. Apparatus for turning slabs and the like having opposite flat faces, comprising an elongated horizontal platform having notches in one longitudinal edge thereof and slots adjacent to said notches, a plurality of substantially straight lift arms pivoted on fixed pivots below said one edge of the platform, a plurality of turning arms pivoted on fixed pivots laterally spaced from the pivots of the lift arms a distance slightly greater than the length of the turning arms below said platform, a segmental portion on the free end of each turning arm and concentric with the pivot thereof, the lift arms being normally located in substantially horizontal position with their upper edges substantially flush with the top of said platform for receiving a slab flatwise thereon with one face thereof upwardly, the turning arms being normally located in lowered position with the segmental portions thereof retracted through said slots in the platform, means for raising the turning arms to project the segmental portions thereof upward through said slots in the platform, means for simultaneously raising the lift arms to upright position into said notches in the platform to turn the slab on edge and deposit it against the segmental portions of the turning arms, means for lowering the lift arms to substantially horizontal position, and means for then lowering the turning arms to cause the slab to slide downward upon the segmental portions of the turning arms and to return to flatwise position upon the lift arms with the opposite flat face thereof upward.

6. Apparatus for turning slabs and the like having opposite flat faces, comprising an elongated horizontal platform having notches in one longitudinal edge thereof and slots adjacent to said notches, a plurality of substantially straight lift arms pivoted on fixed pivots below said one edge of the platform, the lift arms having recesses in their upper surfaces said recesses extending from the pivots to a point thereto, a plurality of turning arms pivoted on fixed pivots laterally spaced from the pivots of the lift arms a distance slightly greater than the length of the turning arms, below said platform, a segmental portion on the free end of each turning arm and concentric with the pivot thereof, the lift arms being normally located in substantially horizontal position with their upper edges substantially flush with the top of said platform for receiving a slab flatwise thereon with one face thereof upward, the turning arms being normally located in lowered position with the segmental portions thereof retracted through said slots in the platform, means for raising the turning arms to project the segmental portions thereof upward through said slots in the platform, means for simultaneously raising the lift arms to upright position into said notches in the platform to turn the slab on edge and deposit it against the segmental portions of the turning arms, the lower edge of the slab being received in said recesses in the lift arms, means for lowering the lift arms to substantially horizontal position causing the lower edge of the slab to slide out of said recesses, and means for then lowering the turning arms to cause the slab to slide downward upon the segmental portions of the turning arms and to return to flatwise position upon the lift arms with the opposite flat face thereof upward.

7. Apparatus for turning slabs and the like having opposite flat faces, comprising an elongated horizontal platform having notches in one longitudinal edge thereof and slots adjacent to said notches, a plurality of substantially straight lift arms pivoted on fixed pivots below said one edge of the platform, a plurality of turning arms pivoted on fixed pivots laterally spaced from the pivots of the lift arms a distance slightly greater than the length of the turning arms, below said platform, the lift arms having recesses in their upper surfaces, said recesses extending from the pivots to a point adjacent thereto, a segmental portion on the free end of each turning arm and concentric with the pivot thereof, there being notches in the peripheries of said segmental portions, the lift arms being normally located in substantially horizontal position with their upper edges substantially flush with the top of said platform for receiving a slab flatwise thereon with one face thereof upward, the turning arms being normally located in lowered position with the segmental portions thereof retracted through said slots in the platform, means for raising the turning arms to project the segmental portions thereof upward through said slots in the platform, means for simultaneously raising the lift arms to upright position into said notches in the platform to turn the slab on edge and deposit it against the segmental portions of the turning arms, the lower edge of the slab being received in said recesses in the lift arms, means for lowering the lift arms to substantially horizontal position to cause the lower edge of the slab to slide out of said recesses and to slide upon the upper edges of the lift arms to position the upper edge of the slab in said peripheral notches in the segmental portions of the turning arms, and means for lowering the turning arms to cause the slab to return to flatwise position upon the lift arms with the opposite flat face thereof upward.

8. Apparatus for turning slabs and the like having opposite flat faces, comprising an elongated horizontal platform having notches in one longitudinal edge thereof and slots adjacent to said notches, a plurality of substantially straight lift arms pivoted on fixed pivots below said one edge of the platform, the lift arms having recesses in their upper surfaces adjacent to the pivots, a plurality of turning arms pivoted on fixed pivots laterally spaced from the pivots of the lift arms a distance slightly greater than the length of the turning arms, below said platform, the lift arms having recesses in their upper surfaces, said recesses extending from the pivots to a point adjacent thereto, a segmental portion on the free end of each turning arm and concentric with the pivot thereof, there being notches in the peripheries of said segmental portions, the lift arms being normally located in substantially horizontal position with their upper edges substantially flush with the top of said platform for receiving a slab flatwise thereon with one face thereof upward, the turning arms being normally located in lowered position with the segmental portions thereof retracted through said slots in the platform, means for raising the turning arms to project the segmental portions thereof upward through said slots in the platform, means for simultaneously raising the lift arms to upright position into said notches in the platform to turn the slab on edge and deposit it against the segmental portions of the turning arms, the lower edge of the slab being received in said recesses in the lift arms, means for lowering the lift arms to substantially horizontal position to cause the lower edge of the slab to slide out of said recesses and to slide upon the left arms to position the upper edge of the slab in said peripheral notches in the segmental portion of the turning arms, and means for lowering the lift arms to cause the slab to return to flatwise position upon the lift arms with the opposite flat face thereof upward.

References Cited in the file of this patent

UNITED STATES PATENTS

| | | |
|---|---|---|
| 1,341,798 | Graham | June 1, 1920 |
| 1,376,300 | Thomas | Apr. 26, 1921 |
| 2,271,213 | Weidner | Jan. 27, 1942 |
| 2,719,060 | Taylor | Sept. 27, 1955 |

FOREIGN PATENTS

| | | |
|---|---|---|
| 256,417 | Germany | Feb. 11, 1913 |